United States Patent
Belady et al.

(10) Patent No.: US 9,416,904 B2
(45) Date of Patent: *Aug. 16, 2016

(54) GAS SUPPLY SHOCK ABSORBER FOR DATACENTER POWER GENERATION

(71) Applicant: Microsoft Corporation, Redmond, WA (US)

(72) Inventors: Christian L. Belady, Mercer Island, WA (US); Sean M. James, Olympia, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 771 days.

This patent is subject to a terminal disclaimer.

(21) Appl. No.: 13/649,100

(22) Filed: Oct. 10, 2012

(65) Prior Publication Data

US 2014/0096837 A1    Apr. 10, 2014

(51) Int. Cl.
| | | |
|---|---|---|
| F16K 31/02 | (2006.01) | |
| F16L 55/033 | (2006.01) | |
| F17D 1/20 | (2006.01) | |

(52) U.S. Cl.
CPC ............. *F16L 55/0333* (2013.01); *F17D 1/20* (2013.01); *Y10T 137/0396* (2015.04)

(58) Field of Classification Search
CPC .. F16L 55/0333; F17D 1/20; F17C 2250/032; F17C 2250/034; F17C 2270/0763; F15B 1/021; F15B 1/024; F15B 1/0275; F15B 1/033; F23K 2900/05002; G05D 16/02; G05D 16/204; G05D 16/202; G05D 16/206; Y10T 137/0396; Y10T 137/264; Y10T 137/7761; Y10T 137/7762; Y10T 137/8593
USPC ............... 137/487.5, 488, 14, 115.25, 561 R; 60/413; 429/22
See application file for complete search history.

(56) References Cited

U.S. PATENT DOCUMENTS

| | | | |
|---|---|---|---|
| 3,486,530 A | | 12/1969 | Mercier |
| 3,941,144 A | * | 3/1976 | Cornil .................... B01F 3/026 137/110 |

(Continued)

FOREIGN PATENT DOCUMENTS

| | | | | |
|---|---|---|---|---|
| DE | 738523 C | | 8/1943 | |
| EP | 1167861 A1 | | 1/2002 | |
| JP | 2005353497 A | * | 12/2005 | ............. G05D 16/02 |

OTHER PUBLICATIONS

"APU/Hydraulics", Retrieved at <<http://www.spaceshuttleguide.com/system/APU.htnn>>, Retrieved Date: Jan. 9, 2012, pp. 27.

(Continued)

*Primary Examiner* — Craig Schneider
*Assistant Examiner* — Minh Le
(74) *Attorney, Agent, or Firm* — Henry Gabryjelski; Kate Drakos; Micky Minhas

(57) ABSTRACT

Gas supply pressure spikes are absorbed and leveled-out by a gas supply shock absorber comprising gas storage, which is charged during positive pressure spikes and utilized during negative pressure spikes. The gas supply shock absorber also comprises pressure sensing and regulating valves, which direct positive pressure spikes to the gas storage and draw gas from storage during negative pressure spikes. A backflow preventer limits shock absorption to co-located equipment, but gas supply shock absorbers operate in aggregate to create additional demand during positive pressure spikes and reduced demand during negative pressure spikes. If the gas storage has sufficient gas, a co-located data center utilizes such gas for increased electrical power generation during increased processing activity, which can be requested or generated. Conversely, if the gas storage has insufficient gas, and a negative pressure spike occurs, the data center throttles down or offloads processing.

11 Claims, 3 Drawing Sheets

(56) References Cited

U.S. PATENT DOCUMENTS

| | | | | |
|---|---|---|---|---|
| 4,088,154 | A * | 5/1978 | Patton | E21B 21/08 137/207 |
| 4,333,496 | A * | 6/1982 | Chow | F16K 7/075 137/489 |
| 5,209,317 | A * | 5/1993 | Schnelle | B62D 5/083 180/417 |
| 5,355,676 | A * | 10/1994 | Inokuchi | G05D 16/208 60/413 |
| 5,396,923 | A * | 3/1995 | Allen | F16L 55/045 137/487.5 |
| 5,509,434 | A * | 4/1996 | Boyd | G05D 7/0635 137/486 |
| 5,586,574 | A * | 12/1996 | Smith | G05D 16/2013 137/487.5 |
| 6,042,791 | A * | 3/2000 | Johnson | F23G 7/061 110/210 |
| 7,042,726 | B2 | 5/2006 | Cader et al. | |
| 7,370,666 | B2 * | 5/2008 | Willets | F02D 29/06 123/27 GE |
| 7,484,521 | B2 * | 2/2009 | Kimbara | F17C 13/025 137/14 |
| 7,560,831 | B2 * | 7/2009 | Whitted | H02J 9/061 307/64 |
| 8,051,672 | B2 | 11/2011 | Mallia et al. | |
| 8,080,900 | B2 * | 12/2011 | Corhodzic | G06F 1/263 307/64 |
| 8,887,498 | B2 * | 11/2014 | Frerichs | F15B 1/027 137/539 |
| 2003/0056839 | A1 | 3/2003 | Kroupa et al. | |
| 2008/0276628 | A1 | 11/2008 | Lee et al. | |
| 2010/0024445 | A1 | 2/2010 | Cichanowicz | |
| 2010/0057271 | A1 | 3/2010 | Lewis et al. | |
| 2011/0247348 | A1 | 10/2011 | Mashiko et al. | |
| 2013/0007515 | A1 | 1/2013 | Shaw et al. | |
| 2013/0111494 | A1 * | 5/2013 | Hyser | G06F 9/5094 718/105 |
| 2013/0199629 | A1 * | 8/2013 | Hemsley | F23K 5/002 137/341 |
| 2013/0333405 | A1 * | 12/2013 | Belady | H05K 7/20836 62/129 |
| 2014/0101462 | A1 * | 4/2014 | Rose | G06F 1/263 713/300 |
| 2014/0167504 | A1 * | 6/2014 | Harris | H02J 9/061 307/23 |
| 2014/0332088 | A1 * | 11/2014 | Senesh | E03B 1/02 137/14 |

OTHER PUBLICATIONS

"International Search Report & Written Opinion for PCT Patent Application No. PCT/US2013/069966", Mailed Date: Nov. 5, 2014, 9 Pages.

* cited by examiner

GAS SUPPLY SHOCK ABSORBER FOR DATACENTER POWER GENERATION

BACKGROUND

The throughput of communications between multiple computing devices continues to increase. Modern networking hardware enables physically separate computing devices to communicate with one another orders of magnitude faster than was possible with prior generations of networking hardware. Furthermore, high-speed network communication capabilities are being made available to a greater number of people, both in the locations where people work, and in their homes. As a result, an increasing amount of data and services can be meaningfully provided via such network communications. As a result, the utility of computing devices increasingly lies in their ability to communicate with one another. For example, users of computing devices traditionally used to utilize computing devices for content creation, such as the creation of textual documents or graphical images. Increasingly, however, the most popular utilizations of computing devices are in the browsing of information sourced from other computing devices, the interaction with other users of other computing devices, the utilization of the processing capabilities of other computing devices and the like.

In particular, it has become more practical to perform digital data processing at a location remote from the location where such data is initially generated, and where the processed data will be consumed. For example, a user can upload a digital photograph to a server and then cause the server to process the digital photograph, changing its colors and applying other visual edits to it. In such an example, the digital processing, such as of the photograph, is being performed by a device that is remote from the user. Indeed, in such an example, if the user was utilizing a battery-operated computing device to interact with the server such as, for example, a laptop or smartphone, the user could be in a location that was not receiving any electrical power at all. Instead, electrical power can have been delivered to the server, which is remote from the user, and the server can have utilized electrical power to process the data provided by the user and then return the processed data to the user.

To provide such data and processing capabilities, via network communications, from a centralized location, the centralized location typically comprises hundreds or thousands of computing devices, typically mounted in vertically oriented racks. Such a collection of computing devices, as well as the associated hardware necessary to support such computing devices, and the physical structure that houses the computing devices and associated hardware, is traditionally referred to as a "data center". With the increasing availability of high-speed network communication capabilities, and thus the increasing provision of data and services from centralized locations, as well as the traditional utilization of data centers, such as the provision of advanced computing services and massive amounts of computing processing capability, the size and quantity of datacenters continues to increase.

However, data centers often consume large quantities of electrical power, especially by the computing devices themselves. Increasingly, the cost of obtaining such electrical power is becoming a primary determinant in the economic success of a data center. Consequently, data centers are being located in areas where the data centers can obtain electrical power in a cost-effective manner. In some instances, data centers are being located in areas that can provide inexpensive electrical power directly, such as areas in which electricity can be purchased from electrical utilities or governmental electrical facilities inexpensively. In other instances, however, data centers are being located in areas where natural resources, from which electrical power can be derived, are abundant and can be obtained inexpensively. For example, natural gas is a byproduct of oil drilling operations and is often considered a waste byproduct since it cannot be economically captured and brought to market. Consequently, in areas where oil drilling operations are being conducted, natural gas is often available for free, or at a minimal cost. As will be recognized by those skilled in the art, natural gas can be utilized to generate electrical power, such as, for example, through a fuel cell or by generating steam to drive a steam powered electrical generator. As another example, municipal landfills and other like waste treatment and processing centers can produce a gas commonly referred to as "biogas" which can, likewise, be utilized to generate electrical power that can, then, be consumed by the computing devices of a data center. Unfortunately, gas that is available at reduced cost cannot always be provided at a well-maintained pressure. Instead, the pressure at which such gases are provided can often vary substantially, including both positive and negative gas pressure spikes where the pressure of the provided gas increases, or decreases, respectively. Not only can such gas pressure spikes damage equipment that utilizes such gas, but they can also be disruptive to the entire gas supply network.

SUMMARY

In one embodiment, a gas supply shock absorber can absorb and level out gas pressure spikes by storing gas during positive pressure spikes and then releasing the stored gas during negative pressure spikes. Such a gas supply shock absorber can comprise a gas storage for storing gas during positive pressure spikes, as well as pressure sensing and pressure regulating valves to control the flow of gas into the gas storage, such as during positive pressure spikes and to control the flow of gas out of the gas storage, such as during negative pressure spikes.

In yet another embodiment, each individual gas supply shock absorber can comprise a backflow preventer such that the gas supply shock absorber only levels out gas pressure spikes for local gas-fed equipment. A sufficient quantity of such individual gas supply shock absorbers on a gas supply network can, in aggregate, act to smooth out the gas pressure on the whole gas supply network, each utilizing their gas storage to increase the ability to consume gas during positive pressure spikes and to reduce demand during negative pressure spikes In a further embodiment, a gas supply shock absorber can be utilized in conjunction with a data center whose electrical power is provided at least in part by devices that consume gas to generate electricity. Such a data center can have varying electrical power demands depending on the workload of the computing devices of the data center. If a sufficient quantity of gas is available in the gas storage of the gas supply shock absorber, an increase in the workload of the computing devices of the data center can be powered by gas from the gas storage, rather than the consumption of additional gas from the gas network.

In a still further embodiment, if the gas storage of a gas supply shock absorber has a sufficient quantity of gas, the data center can request additional processing from other data centers to consume some of the gas in the gas storage. Similarly, if the gas storage of the gas supply shock absorber does not have a sufficient quantity of gas, and the gas network experiences a negative pressure spike, the data center can throttle down the processing of its computing devices, or can offload some or all of its processing to other data centers.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Additional features and advantages will be made apparent from the following detailed description that proceeds with reference to the accompanying drawings.

DESCRIPTION OF THE DRAWINGS

The following detailed description may be best understood when taken in conjunction with the accompanying drawings, of which.

DETAILED DESCRIPTION

Figure 1:
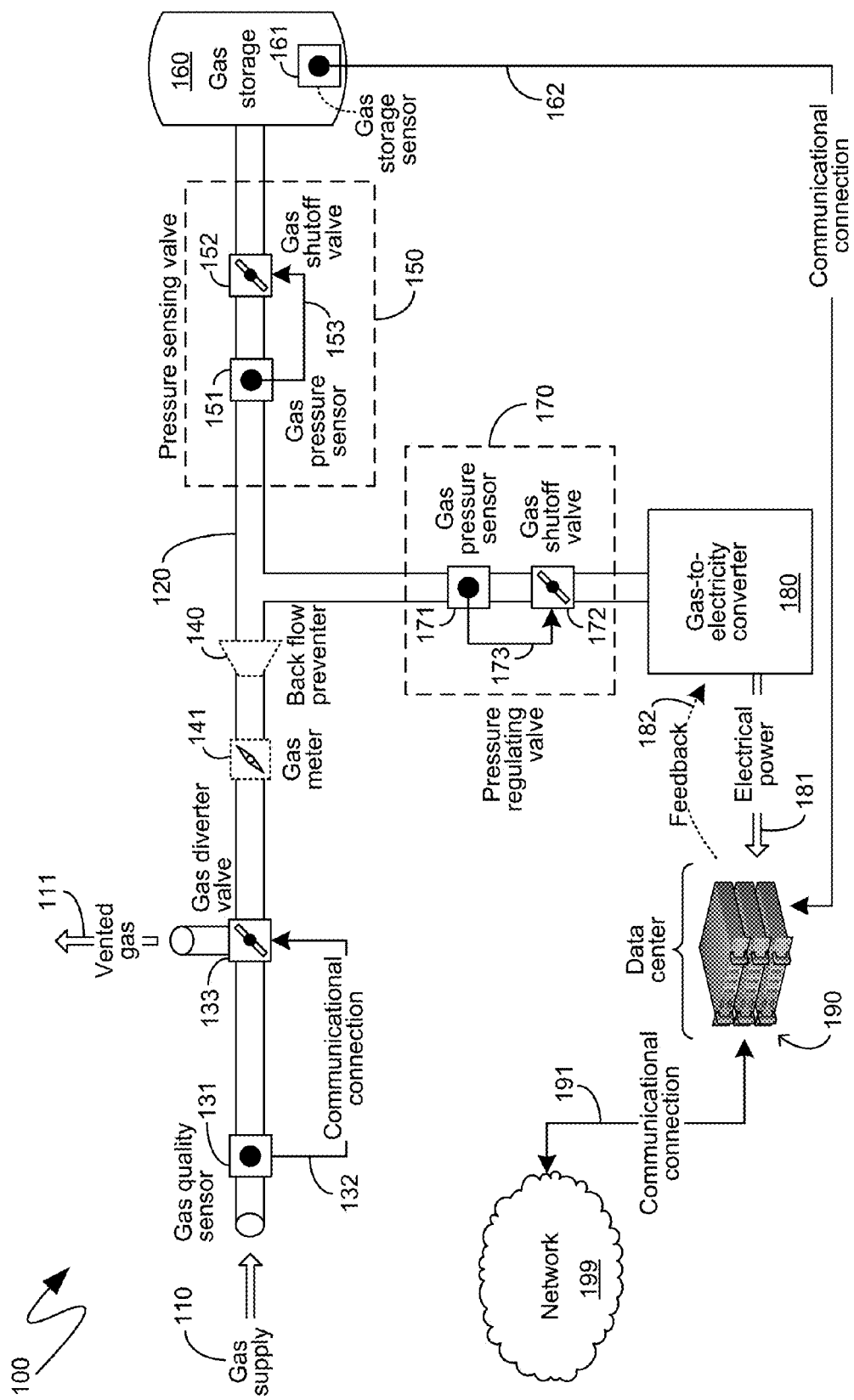
FIG. 1 is a component diagram of an exemplary gas shock absorber, shown together with an associated gas-powered data center.

The following description relates to the absorption and leveling out of gas supply pressure spikes by a gas supply shock absorber. A gas supply shock absorber can comprise gas storage that can be charged with pressurized gas during positive pressure spikes in the gas supply, and which can subsequently utilize such stored gas during negative pressure spikes in the gas supply, thereby leveling out gas supply pressure spikes. Together with the gas storage, a gas supply shock absorber can also comprise pressure sensing valves and pressure regulating valves, which can detect positive pressure spikes in the gas supply and enable such overly pressurized gas to charge the gas storage, and which can also detect negative pressure spikes in the gas supply and, in response, make available the gas stored in the gas storage to compensate for such negative pressure spikes. A backflow preventer can limit the absorption of gas supply pressure spikes to gas equipment co-located with the gas supply shock absorber. Nevertheless, a gas supply network having connected thereto multiple such gas supply shock absorbers can experience less disruptive gas pressure spikes, since each gas supply shock absorber can create additional gas demand during positive pressure spikes, such as in the form of accepting additional gas for storage, and can create reduced gas demand during negative pressure spikes, such as by utilizing locally stored gas. A data center co-located with a gas supply shock absorber can be provided with electrical power from a gas-consuming device, and the amount of power consumed by the data center can vary depending on the processing workload of the computing devices of the data center. If the gas storage has a sufficient quantity of gas stored therein, the data center can utilize such gas to provide increased electrical power during periods of increased processing activity and workload. The data center can additionally request workload from other data centers, in such an instance, or can generate additional workload by, for example, reducing the cost of the processing provided by the computing devices of the data center. Conversely, if the gas storage has an insufficient quantity of gas stored therein, and the gas supply experiences a negative pressure spike, the computing devices of the data center can be throttled down to consume less electrical power, or, alternatively, or in combination, workload from the computing devices of the data center can be transferred to other data centers.

The techniques described herein make reference to specific types of gas and specific types of gas-consuming equipment. For example, reference is made to natural-gas-powered generators, such as a fuel cell. Such references, however, are strictly exemplary and are made for ease of description and presentation, and are not intended to limit the mechanisms described to specific generators and utilizations of water enumerated. Instead, the techniques described herein are equally applicable, without modification, to the absorption of gas supply pressure spikes, irrespective of the type of gas experiencing the spikes, and irrespective of the equipment consuming such gas.

Although not required, aspects of the descriptions below will be provided in the general context of computer-executable instructions, such as program modules, being executed by a computing device. More specifically, aspects of the descriptions will reference acts and symbolic representations of operations that are performed by one or more computing devices or peripherals, unless indicated otherwise. As such, it will be understood that such acts and operations, which are at times referred to as being computer-executed, include the manipulation by a processing unit of electrical signals representing data in a structured form. This manipulation transforms the data or maintains it at locations in memory, which reconfigures or otherwise alters the operation of the computing device or peripherals in a manner well understood by those skilled in the art. The data structures where data is maintained are physical locations that have particular properties defined by the format of the data.

Generally, program modules include routines, programs, objects, components, data structures, and the like that perform particular tasks or implement particular abstract data types. Moreover, those skilled in the art will appreciate that the computing devices need not be limited to conventional server computing racks or conventional personal computers, and include other computing configurations, including handheld devices, multi-processor systems, microprocessor based or programmable consumer electronics, network PCs, minicomputers, mainframe computers, and the like. Similarly, the computing devices need not be limited to a stand-alone computing device, as the mechanisms may also be practiced in distributed computing environments linked through a communications network. In a distributed computing environment, program modules may be located in both local and remote memory storage devices.

With reference to FIG. 1, an exemplary system 100 is illustrated for absorbing gas supply pressure spikes. For example, the exemplary system 100 can be located in an area where the gas supply 110 can be plentiful or otherwise available at a minimal cost, but such a gas supply 110 can also experience pressure spikes, including positive pressure spikes where the pressure of the gas supply 110 can increase, and negative pressure spikes where the pressure of the gas supply 110 can decrease. The gas supply 110 can supply any type of gas that can be utilized, either directly or indirectly, by a consumer, such as the data center 190. For example, the gas supplied by the gas supply 110 can include natural gas, biogas, methane, propane or other hydrocarbons, hydrogen, or any other fuel that can be accepted by a gas-to-electricity converter 180, such as a generator, which can generate electrical power 181, or other type of power, for the data center 190. As indicated previously, the mechanisms described herein are not limited by the type of power that is generated from the gas, nor are they limited by the type of gas.

In one common example, the gas provided by the gas supply 110 can be natural gas that can be provided to a fuel cell, which can act as the gas-to-electricity converter 180. In such an exemplary embodiment, the fuel cell, acting as the gas-to-electricity converter 180, can generate power for the data center 190 in the form of direct current electrical power 181 from the natural gas. More specifically, and as will be understood by those skilled in the art, a fuel cell, such as a gas solid oxide fuel cell, can comprise an electrolyte, typically in the form of a solid ceramic material, and an anode and cathode on opposite sides of the electrolyte, each typically comprised of an ink coating on the electrolyte. Such a fuel cell can accept natural gas as an input and, inside of the fuel cell, the natural gas can be mixed with water steam to form a "reformed fuel". This reformed fuel can then enter the anode side of the electrolyte and, as it crosses the anode, it can attract oxygen ions from the cathode, which are attracted into the cathode from the hot air that is fed to the fuel cell. The oxygen ions combine with the reformed fuel in the electrolyte to produce electricity, water, and small amounts of carbon dioxide, as well as heat.

As will also be recognized by those skilled in the art, certain ones of the gas-to-electricity converter 180, such as the above-described fuel cell, can be sensitive to varying gas pressures, and can be damaged by gas that is provided at too high a pressure. Consequently, in one embodiment, the system 100 of FIG. 1 can be utilized to absorb, or "level out", shocks in the pressure of the gas supply 110, including positive pressure spikes and negative pressure spikes. As illustrated in FIG. 1, the system 100 can comprise a gas transmission apparatus, such as a piping system 120, through which pressurized gas can flow and be provided to gas-consuming devices, such as the gas-to-electricity converter 180. The piping 120 accepts pressurized gas from the gas supply 110 and can deliver it to gas-consuming devices, such as the gas-to-electricity converter 180.

In one embodiment, to protect the gas-to-electricity converter 180 from gas pressure spikes that can be damaging to the gas-to-electricity converter 180, a pressure regulating valve 170 can be installed in-line with the flow of gas, through the piping 120, from the gas supply 110 to the gas-to-electricity converter 180. As illustrated, a pressure regulating valve can comprise a gas pressure sensor 171 and a gas shutoff valve 172, and a communicational connection 173 between them such that the gas pressure detected by the gas pressure sensor 171 can be utilized to inform whether the gas shutoff valve 172 allows gas to pass through the piping 120 to the gas-to-electricity converter 180, or whether the gas shutoff valve 172 prevents any gas from flowing through the piping 120 to the gas-to-electricity converter 180. Typically, it will be recognized by those skilled in the art, the pressure regulating valve 170 can remain open so long as the gas pressure in the piping 120 is below an upper threshold pressure that can be based on the maximum gas pressure acceptable by the gas-to-electricity converter 180. Once the gas pressure in the piping 120 exceeds such an upper threshold pressure, the gas pressure sensor 171 can sense such an increase in the gas pressure and can cause the gas shutoff valve 172 to stop the flow of gas to the gas-to-electricity converter 180. Conversely, if the gas pressure provided from the gas supply 110 experiences a negative pressure spike, the pressure regulating valve 170 can remain open, allowing for the provision of gas to the gas-to-electricity converter 180, but the pressure at which such gas is provided may be insufficient to enable the gas-to-electricity converter 180 to generate the electrical power 181 required by the data center 190.

To provide for gas pressure shock absorption, in one embodiment, the system 100 can comprise a gas storage 160 that can be connected with the piping 120 such that the gas storage 160 can accept pressurized gas for storage when the pressure of the gas provided by the gas supply 110 experiences a positive pressure spike. In particular, in one embodiment, the piping 120 can have connected, in-line, a pressure sensing valve 150 between the gas supply 110 and the gas storage 160. Like the pressure regulating valve 170, the pressure sensing valve 150, in one embodiment, can comprise a gas pressure sensor 151, a gas shutoff valve 152 and a communicational connection 153 between them. As such, the gas shutoff valve 152 can either allow, or prevent, the flow of gas from the gas supply 110 into the gas storage 160, depending on the pressure sensed by the gas pressure sensor 151. For example, were the gas supply 110 to experience a positive gas pressure spike, the gas pressure sensor 171 of the pressure regulating valve 170 could detect such a high-pressure and could trigger the gas shutoff valve 172 to stop the flow of pressurized gas to the gas-to-electricity converter 180. Similarly, the gas pressure sensor 151 of the pressure sensing valve 150 could detect to the same high pressure and could trigger the gas shutoff valve 152 to open and enable the flow of pressurized gas from the gas supply 110 into the gas storage 160. In such a manner, the gas storage 160 can be "charged", or filled with gas.

In one embodiment, as the positive gas pressure spike ends, and the gas pressure provided by the gas supply 110 returns to normal, the gas pressure sensor 171 of the pressure regulating valve 170 can detect such a decrease in gas pressure and can, consequently, cause the gas shutoff valve 172 to open back up and enable the flow of pressurized gas from the gas supply 110 to the gas-to-electricity converter 180. Similarly, the gas pressure sensor 151 of the pressure sensing valve 150 can also detect the decrease in gas pressure and can cause the gas shutoff valve 152 to close and prevent the flow of gas out of the gas storage 160, since, as will be recognized by those skilled in the art, because the gas storage 160 was charged with a higher pressure gas, a decrease in the pressure of the gas provided by the gas supply 110 can result in a negative differential between the pressure of the gas in the gas storage 160 and the pressure of the gas now being provided by the gas supply 110 and in the piping 120, thereby potentially causing the gas in the gas storage 160 to flow back into the piping 120, unless the gas shutoff valve 152 closes. In such a manner, the gas storage 160 can be filled with pressurized gas during a positive gas pressure spike, which can then be retained while the pressure of the gas supplied by the gas supply 110 returns to lower, normal pressures.

Should the gas supply 110 subsequently experience a negative gas pressure spike, such that the pressure of the gas supplied by the gas supply 110 decreases, in one embodiment, the gas pressure sensor 151 of the pressure sensing valve 150 can detect such a decrease in the gas pressure and can cause the gas shutoff valve 152 to open to enable gas from the gas storage 160 to flow into the piping 120, thereby increasing the gas pressure in the piping 120 and providing the gas-to-electricity converter 180 with a sufficient pressure to continue to provide sufficient electrical power 181 to the data center 190. In such a manner, the gas storage 160, together with the pressure sensing valve 150, can act as a gas supply shock absorber, accepting additional gas during positive gas pressure spikes in the gas being supplied by the gas supply 110, and sourcing additional gas during negative gas pressure spikes. In particular, the gas storage 160 provides additional demand for gas during positive gas pressure spikes, since the filling of the gas storage 160 comprises a consumption of gas, and causes reduced demand for gas during negative gas pressure spikes, since the provision of gas from the gas storage 160 reduces the amount of gas required from the gas supply 110.

In one embodiment, the system 100 of FIG. 1 can comprise a backflow preventer 140, thereby preventing gas that is supplied by the gas storage 160 from being provided back to the gas supply 110. In particular, and as described above, the gas storage 160 can store gas at a high pressure, such as gas that can have been provided to the gas storage 160 during a period when the gas supply 110 was experiencing a positive pressure spike. Subsequently, and as also described above, if the gas supply 110 were to experience a negative pressure spike, the gas from the gas storage 160 can be provided back into the piping 120 to, for example, provide sufficient gas to the gas-to-electricity converter 180. However, as will be recognized by those skilled in the art, absent a backflow preventer 140, the gas provided by the gas storage 160 during negative pressure spikes can flow, not to the gas-to-electricity converter 180, or other local consumer of gas, but rather back to the gas supply 110. As such, the optional backflow preventer 140 enables the gas stored in the gas storage 160 to be used for local gas consumers. In another embodiment, if the gas supply 110 is metered, by the optional gas meter 141, such that the provision of gas back to the gas supply 110 results in a corresponding credit, than the backflow preventer 140 need not be present, since the provision of gas from the gas storage 160 back to the gas supply 110 would result in a monetary benefit.

From the perspective of a gas network, such as the gas supply 110, that can supply gas to a myriad of consumers, the above described gas supply shock absorber can be implemented by a number of those consumers and such gas supply shock absorbers can act in aggregate to smooth out gas pressure spikes in the gas supply 110. More specifically, even if each gas consuming entity utilized a backflow preventer, such as the backflow preventer 140, the aggregate effect of multiple gas supply shock absorbers, installed by multiple ones of the consumers of gas to which the gas supply 110 provides gas, can be to increase the demand for gas during positive pressure spikes, thereby reducing the magnitude of such positive pressure spikes with such increased demand, and can further be to decrease the demand for gas during negative pressure spikes, thereby reducing the magnitude of such negative pressure spikes with reduced demand. For example, during a positive pressure spike, each of the individual gas supply shock absorbers can open the valves to their gas storages, such as the exemplary gas storage 160, so as to charge each of those individual gas storages. Each gas storage, such as the exemplary gas storage 160, can, as described above, represent a consumer of gas and can create demand for gas. The aggregate effect, therefore, of each of the individual gas supply shock absorbers opening the valves to their gas storages during a positive pressure spike can be to increase the demand for gas, thereby more quickly dissipating the positive gas pressure spike. As another example, during a negative pressure spike, each of the individual gas supply shock absorbers can open the valves to their gas storages, such as the exemplary gas storage 160, so as to provide gas from each of those individual gas storages to those devices consuming gas. Since the devices consuming gas would, in such an instance, be receiving at least some of their gas from the individual gas storages, the aggregate effect of each of the individual gas supply shock absorbers opening the valves to their gas storage during a negative pressure spike can be to decrease the demand for gas from the gas supply, thereby enabling the gas supply to increase pressure across such a reduced demand and more quickly dissipate the negative gas pressure spike.

Although not part of a gas supply shock absorber, the system 100 of FIG. 1 also illustrates an optional gas quality sensor 131 that can be communicatively coupled to a gas diverter valve 133 via the communicational connection 132. As indicated previously, in one embodiment, the gas supply 110 can be from non-regulated gas sources, such as the gas produced from a landfill, or gas produced as a waste product of oil drilling. As will be recognized by those skilled in the art, such gas can contain impurities that can damage various gas-consuming equipment such as, for example, the gas-to-electricity converter 180. For example, such gas can comprise too much sulfur, carbon dioxide, siloxanes, or other like impurities. Thus, in one embodiment, a gas quality sensor 131 can be positioned to monitor the quality of the gas received from the gas supply 110. Should the gas quality sensor 131 detect that the quality of gas being provided is no longer acceptable, the gas diverter valve 133 can be triggered and the gas provided by the gas supply 110 can be vented as vented gas 111. The gas quality sensor 131 and the gas diverter valve 133 can be spaced sufficiently apart such that the gas diverter valve 133 can trigger prior to the arrival of the gas, down the piping 120, that was deemed to be of insufficient quality by the gas quality sensor 131 as such gas passed its detection.

While the system 100 of FIG. 1 is shown as comprising a data center 190, the above-described gas supply shock absorber does not require any such data center 190 and can operate equally well with any gas-consuming entity. Nevertheless, in one embodiment, an advantage of a gas consuming entity, such as the data center 190 in combination with a gas-to-electricity converter 180 that provides electrical power 181 to the data center 190, can be that such an entity can dynamically vary the amount of gas consumed in response to variations in the system 100. For example, the data center 190 can comprise a communicational connection 191 to a network 199, as illustrated in the system 100 of FIG. 1, through which the data center 190 can communicate with other data centers, including remotely located data centers, which also comprise their own communicational connections to the network 199. Such a communicational connection 191 to the network 199 can enable the data center 190 to request additional processing work from other data centers, thereby increasing its consumption of the electrical power 181, in turn increasing the amount of gas consumed by the gas-to-electricity converter 180. Similarly, the communicational connection 191 to the network 199 can enable the data center 190 to offload processing work to the other data centers, thereby decreasing its consumption of electrical power 181, in turn decreasing the amount of gas consumed by the gas-to-electricity converter 180.

In one embodiment, the data center 190 can provide feedback 182 to the gas-to-electricity converter 180 to communicate the data center's power needs. For example, if the data center 190, in communications with other data centers via the network 199, obtains additional processing, then the data center 190 can inform the gas-to-electricity converter 180, via the feedback 182, that the data center 190 will utilize additional power, thereby enabling the gas-to-electricity converter 180 to supply such additional power. Similarly, as another example, if the data center 190 offloads processing to other data centers, then the data center 190 can, via the feedback 182, notify the gas-to-electricity converter 180 that the data center 190 will utilize a reduced amount of power, thereby enabling the gas-to-electricity converter 180 to supply such a reduced amount of power and, thus, consume less gas. In one embodiment, the feedback 182 can be an explicit communicational coupling between the data center 190 and the gas-to-electricity converter 180. In another embodiment, however, the feedback 182 can be an implicit coupling based on variations in supplied electrical parameters, such as current or voltage. For example, if the gas-to-electricity converter 180 is acting as a voltage source, then, when the data center 190 begins to consume a greater amount of power, the voltage supplied by the gas-to-electricity converter 180 can temporarily drop as the gas-to-electricity converter 180 struggles to provide the increased power. Such a drop in the voltage can, in such an embodiment, act as the feedback 182, thereby notifying the gas-to-electricity converter 180 that the data center 190 requires additional power. By establishing some form of feedback between the data center 190 and the gas-to-electricity converter 180, regarding the power consumption of the data center 190, the gas-to-electricity converter 180 can dynamically adjust the electrical power 181 that it provides to the data center 190. Consequently, as can be seen, the gas consumed by the combination of the data center 190 and the gas-to-electricity converter 180 that powers the data center 190 can be varied.

In one embodiment, a gas storage sensor 161 can monitor the gas in the gas storage 160 and can, via the communicational connection 162, provide such information to processes executing as part of the data center 190. Other gas-related inputs can also be received by the data center 190, although they are not specifically shown in the system 100 of FIG. 1. For example, the data center 190 can receive inputs regarding the pressure of the gas being provided by the gas supply 110. As another example, the data center 190 can receive inputs regarding future gas-related issues, such as weather forecasts, regional infrastructure stability issues, and other like information. The processes executing within the data center 190, or remotely executing processes that communicate with the data center 190, such as via the network 199, can utilize such information to more efficiently operate the gas supply shock absorber described in detail above.

For example, if the gas storage 160 is already charged, then it may not be able to function efficiently to absorb a subsequent positive gas pressure spike. Consequently, in one embodiment, it can be considered desirable for the gas storage 160 to comprise some gas, with which the gas storage 160 can act to lessen the impact of negative gas pressure spikes, but that the gas storage 160 not be so full of gas that it cannot efficiently absorb subsequent positive gas pressure spikes. In such an embodiment, if gas storage sensor 161 indicates that the gas storage 160 comprises so much gas that it may not be able to efficiently absorb subsequent positive gas pressure spikes, the data center 190 can request additional processing work, such as from other data centers via the network 199, thereby increasing its consumption of the electrical power 181 and, in turn, increasing the consumption of gas by the gas-to-electricity converter 180. The additional gas consumed by the gas-to-electricity converter 180 can be sourced, at least in part, from the gas storage 160. More specifically, as the gas consumed by the gas-to-electricity converter 180 increases to provide the increased electrical power 181 to the data center 190 to support the increased processing workload of the data center 190, the gas shutoff valve 152 can be instructed to open and allow gas from the gas storage 160 to flow into the piping 120 and be at least part of the additional gas that is consumed by the gas-to-electricity converter 180. In an analogous embodiment, rather than requesting additional processing work from other data centers, the data center 190 can generate such additional processing work by, for example, discounting the cost of processing to the consumers of such processing, such as the clients of the data center 190, thereby spurring such customers to provide additional processing work load to the data center 190 and, thus, increasing the workload of the data center 190.

In another embodiment, should the gas storage sensor 161 indicate that there is an insufficient amount of gas in the gas storage 160 such that the gas storage 160 could not source a sufficient amount of gas to meaningfully absorb the shock of a subsequent negative gas pressure spike, the data center 190 could offload some of it is processing workload, thereby consuming less electrical power 181 and, consequently, causing the gas-to-electricity converter 180 to consume less gas. The gas not consumed by the gas-to-electricity converter 180 can, instead, be used to at least partially charge the gas storage 160 such that the gas storage 160 comprises a sufficient amount of gas to meaningfully absorb the shock of a subsequent negative gas pressure spike. Alternatively, rather than offloading processing workload, the data center 190 could reduce its consumption of electrical power 181 by alternative means such as, for example, by throttling down at least some of the processors of computing devices of the data center 190.

Figure 2:
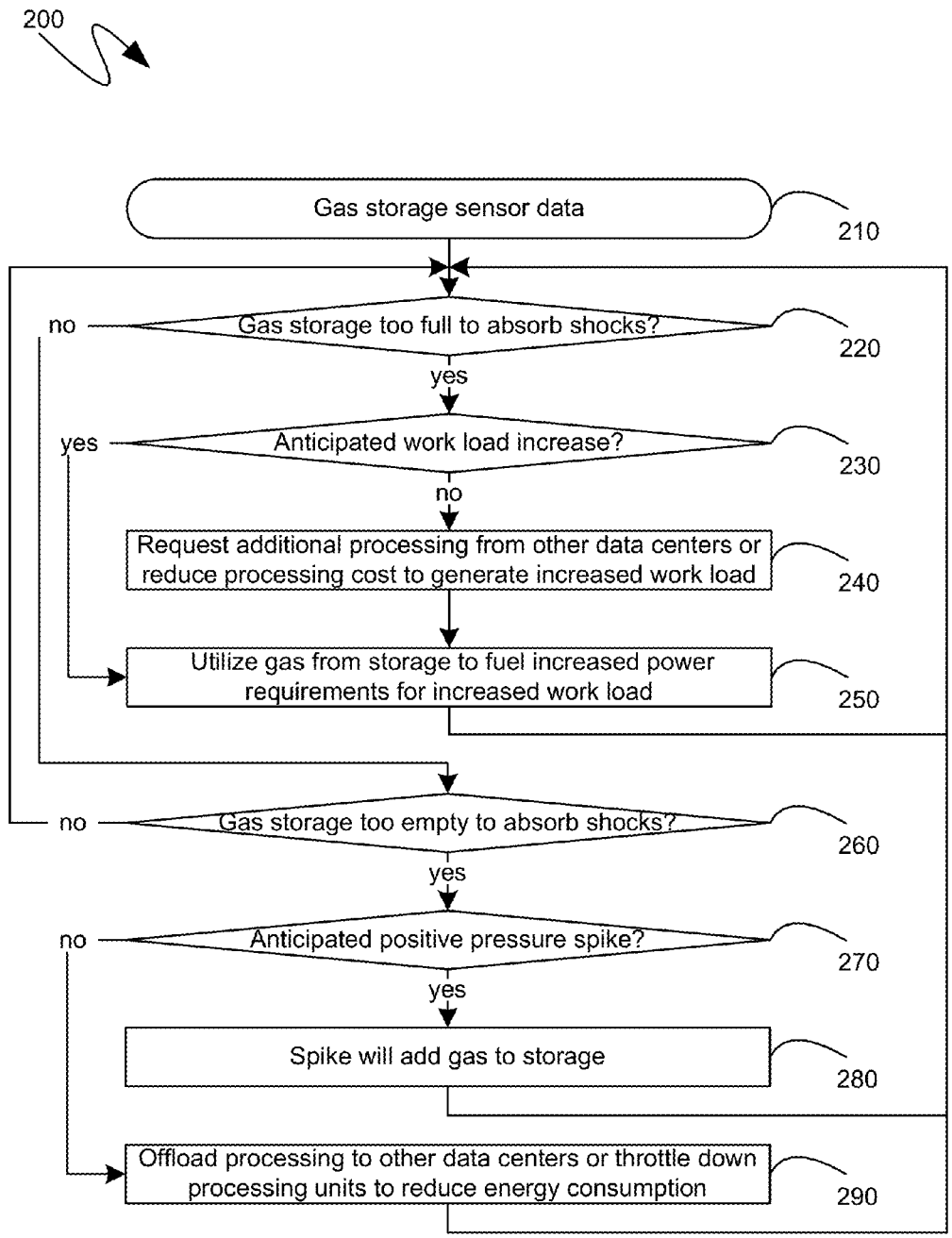
FIG. 2 is a flow diagram of an exemplary utilization of stored gas by an associated data center.

As can be seen from the above descriptions, a data center, such as the data center 190, can be a part of a dynamic consumer of gas whose consumption of gas can be varied in accordance with external factors. Such a dynamic consumer of gas can then, such as in the manner described in detail above, further enhance the ability of the system 100 to absorb gas pressure shocks. In particular, in the specific example of a data center, the movement of processing work to or from the data center can control gas pressure and, as such, aid in the absorbing of gas pressure shocks. Turning to FIG. 2, the flow diagram 200 shown therein illustrates an exemplary series of steps that can be performed by processes seeking to dynamically vary the consumption of gas by, for example, a data center. Initially, as shown, at step 210, sensor data from one or more gas storage units can be received.

Subsequently, at step 220, a determination can be made whether the received sensor data indicates that the gas storage is too full to absorb positive gas pressure shocks. If, at step 220, it is determined that the gas storage is too full to absorb positive gas pressure shocks, processing can proceed to step 230 at which point a determination can be made as to whether an increase in the processing workload of a data center that is powered, either directly or indirectly, by such gas is expected to increase. For example, and as will be known by those skilled in the art, the processing workload of data centers can often follow cyclical patterns such as, for example, increasing during local business hours, increasing on specific days of the week, or other like patterns. If, at step 230, a processing workload increase is anticipated, then processing can proceed to step 250, where the increased power requirements of the data center during such increased processing can be met at least in part by utilizing gas from the gas storage. Processing can then return to step 220. Alternatively, if, at step 230, there is no anticipated processing workload increase, processing can initially proceed to step 240, where the data center can request additional processing workload from other data centers, or can reduce the processing cost charged to its customers to encourage or generate increased processing workload from such customers. Processing can then proceed to step 250 where the gas from the gas storage can be utilized to fuel at least part of the increased power requirements for the increased processing workload. As before, processing can then return to step 220.

If the sensor data received at step 210 does not indicate that the gas storage is too full to absorb shocks, such as determined at step 220, processing can proceed to step 260, at which point a determination can be made as to whether the gas storage is too empty to absorb negative gas pressure shocks. If, at step 260, it is determined that the gas storage is not too empty to absorb negative gas pressure shocks, then processing can, again, return to step 220. Conversely, if, at step 260, it is determined that the gas storage is too empty to absorb negative gas pressure shocks, then processing can proceed with step 270 where a determination can be made as to whether a positive gas pressure spike is anticipated. For example, positive gas pressure spikes can occur with an average frequency such as, for example, occurring, on average, once every couple of hours or once every couple of days. Such historical data can, in one embodiment, be taken into account, such as is illustrated by step 270. If, at step 270, historical data indicates that a positive gas pressure spike may occur within a short time interval, then such a positive gas pressure spike can add gas to the gas storage, such as in the manner described in detail above, and as is represented by step 280, and processing can proceed to step 220. Conversely, if, at step 270, there is no anticipated positive gas pressure spike, then processing can proceed to step 290 and processing by the data center can be offloaded to other data centers, or one or more individual processing units can be throttled down, to reduce the overall energy consumption of the data center. With such reduced energy consumption, the gas not consumed to power the data center can be utilized to, instead, charge the gas storage. Processing can then return to step 220.

As will be recognized by those skilled in the art, the flow diagram 200 of FIG. 2 is meant to be exemplary and is not meant to limit the mechanisms described to the specific steps and orders illustrated. For example, the determinations of steps 220 and 260 can be performed as part of a single function that evaluates the sensor data received at step 210 and determines whether the gas storage is too full, too empty, or is at an appropriate level. Similarly, steps such as step 280 are really meant to represent actions performed as part of the physical gas supply shock absorber system described in detail above, and need not necessarily involve any specific data processing. In addition, predictive steps, such as step 270, can be optional since, in one embodiment, if it is determined that the gas storage is too empty, such as at step 260, processing can proceed directly to step 290 in order to make available additional gas for charging the gas storage. In yet another embodiment, a gas storage that is deemed to be too empty can be charged independently of any actions by a data center to adjust its power consumption.

Figure 3:
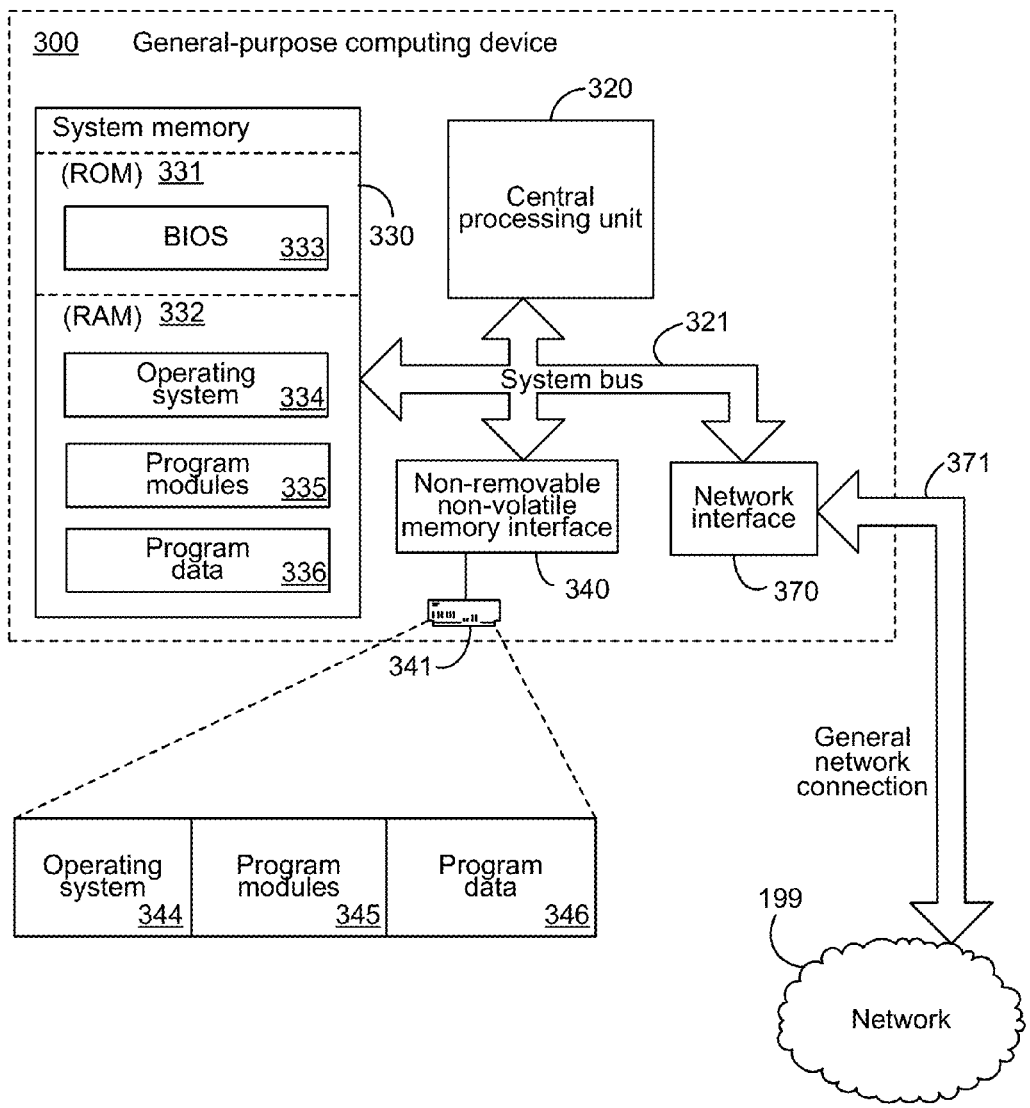
FIG. 3 is a block diagram illustrating an exemplary general purpose computing device.

The steps of the flow diagram 200 of FIG. 2 can be performed by one or more of the computing devices of the data center, or can be performed by one or more computing devices that are remote from the data center. Turning to FIG. 3, an exemplary general-purpose computing device, such as one of the one or more computing devices that can perform the steps of the flow diagram of FIG. 2, is illustrated in the form of the exemplary general-purpose computing device 300. The exemplary general-purpose computing device 300 can include, but is not limited to, one or more central processing units (CPUs) 320, a system memory 330 and a system bus 321 that couples various system components including the system memory to the processing unit 320. The system bus 321 may be any of several types of bus structures including a memory bus or memory controller, a peripheral bus, and a local bus using any of a variety of bus architectures. Depending on the specific physical implementation, one or more of the CPUs 320, the system memory 330 and other components of the general-purpose computing device 300 can be physically co-located, such as on a single chip. In such a case, some or all of the system bus 321 can be nothing more than communicational pathways within a single chip structure and its illustration in FIG. 3 can be nothing more than notational convenience for the purpose of illustration.

The general-purpose computing device 300 also typically includes computer readable media, which can include any available media that can be accessed by computing device 300. By way of example, and not limitation, computer readable media may comprise computer storage media and communication media. Computer storage media includes media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by the general-purpose computing device 300. Communication media typically embodies computer readable instructions, data structures, program modules or other data in a modulated data signal such as a carrier wave or other transport mechanism and includes any information delivery media. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 330 includes computer storage media in the form of volatile and/or nonvolatile memory such as read only memory (ROM) 331 and random access memory (RAM) 332. A basic input/output system 333 (BIOS), containing the basic routines that help to transfer information between elements within computing device 300, such as during start-up, is typically stored in ROM 331. RAM 332 typically contains data and/or program modules that are immediately accessible to and/or presently being operated on by processing unit 320. By way of example, and not limitation, FIG. 3 illustrates operating system 334, other program modules 335, and program data 336.

When using communication media, the general-purpose computing device 300 may operate in a networked environment via logical connections to one or more remote computers. The logical connection depicted in FIG. 3 is a general network connection 371 to the network 199, which can be a local area network (LAN), a wide area network (WAN) such as the Internet, or other networks. The computing device 300 is connected to the general network connection 371 through a network interface or adapter 370 that is, in turn, connected to the system bus 321. In a networked environment, program modules depicted relative to the general-purpose computing device 300, or portions or peripherals thereof, may be stored in the memory of one or more other computing devices that are communicatively coupled to the general-purpose computing device 300 through the general network connection 371. It will be appreciated that the network connections shown are exemplary and other means of establishing a communications link between computing devices may be used.

The general-purpose computing device 300 may also include other removable/non-removable, volatile/nonvolatile computer storage media. By way of example only, FIG. 3 illustrates a hard disk drive 341 that reads from or writes to non-removable, nonvolatile media. Other removable/non-removable, volatile/nonvolatile computer storage media that can be used with the exemplary computing device include, but are not limited to, magnetic tape cassettes, flash memory cards, digital versatile disks, digital video tape, solid state RAM, solid state ROM, and the like. The hard disk drive 341 is typically connected to the system bus 321 through a non-removable memory interface such as interface 340.

The drives and their associated computer storage media discussed above and illustrated in FIG. 3, provide storage of computer readable instructions, data structures, program modules and other data for the general-purpose computing device 300. In FIG. 3, for example, hard disk drive 341 is illustrated as storing operating system 344, other program modules 345, and program data 346. Note that these components can either be the same as or different from operating system 334, other program modules 335 and program data 336. Operating system 344, other program modules 345 and program data 346 are given different numbers here to illustrate that, at a minimum, they are different copies.

As can be seen from the above descriptions, a gas supply shock absorber has been presented. Which, in view of the many possible variations of the subject matter described herein, we claim as our invention all such embodiments as may come within the scope of the following claims and equivalents thereto.

We claim:

1. A system for absorbing gas supply shocks, the system comprising:
    a gas storage for storing pressurized gas;
    a gas consuming device;
    a pressure sensing valve configured to allow gas flow from a gas supply into the gas storage only when a pressure of the gas provided from the gas supply exceeds a maximum gas pressure acceptable by the gas consuming device and to allow the flow of at least some gas out of the gas storage to the gas consuming device during a negative pressure spike in the gas provided from the gas supply
    a pressure regulating valve configured to prevent gas flow from the gas supply to the gas consuming device when the pressure of the gas provided from the gas supply exceeds the maximum gas pressure acceptable by the gas consuming, device; and
    a gas transmission apparatus connecting the gas supply, the gas storage and the gas consuming device such that gas can be provided from the gas supply to both the gas storage and the gas consuming device and such that gas can be provided to the gas consuming device from both the gas supply and the gas storage.

2. The system of claim 1, further comprising a back flow preventer configured to prevent gas flow from the gas storage back to the gas supply.

3. The system of claim 1, further comprising a gas meter configured to provide credit for gas provided from the gas storage back to the gas supply.

4. The system of claim 1, further comprising a data center, wherein the gas consuming device is a gas-to-electricity converter providing electrical power to the data center.

5. The system of claim 4, wherein the gas-to-electricity converter is a fuel cell and the electrical power provided to the data center is a direct current electrical power.

6. The system of claim 4, wherein, if the gas storage comprises greater than a threshold amount of gas, thereby preventing the gas storage from absorbing a future positive gas pressure spike, then processing performed by the data center is increased, thereby causing the gas-to-electricity converter to consume a greater quantity of gas in order to source the electrical power required by the data center to perform the increased processing, and wherein further at least some of the greater quantity of gas is from the gas storage, thereby reducing an amount of gas in the gas storage.

7. The system of claim 4, wherein, if the gas storage comprises less than a threshold amount of gas, thereby preventing the gas storage from sourcing gas to absorb a future negative gas pressure spike, then processing performed by the data center is decreased, thereby causing the gas-to-electricity converter to consume a lesser quantity of gas, and wherein further at least some of the gas no longer utilized by the gas-to-electricity converter, due to the consumption of the lesser quantity of gas, is directed to the gas storage, thereby increasing the amount of gas in the gas storage.

8. The system of claim 4, further comprising one or more computer-readable media comprising computer-executable instructions for absorbing gas supply shocks, the computer-executable instructions directed to steps comprising:
    determining that an amount of gas in the gas storage is above a first threshold level, the gas storage acting as a gas supply shock absorber by storing gas during a positive gas pressure spike and releasing gas during a negative gas pressure spike; and
    increasing, in response to the determining, processing performed by the data center, the data center receiving electrical power from the gas-to-electricity converter, the increased processing resulting in increased gas consumption by the gas-to-electricity converter;
    wherein at least some of the increased gas consumed by the gas-to-electricity converter is sourced from the gas storage, thereby reducing the amount of gas in the gas storage.

9. The system of claim 8, wherein the computer-executable instructions for increasing the processing performed by the data center comprise computer-executable instructions for requesting additional processing workload from other data centers.

10. The system of claim 8, wherein the computer-readable storage media comprise further computer executable instructions for:
    determining that the amount of gas in the gas storage is below a second threshold level; and
    decreasing, in response to the determining that the amount of gas is below the second threshold, the processing performed by a data center, the decreased processing resulting in decreased gas consumption by the gas-to-electricity converter;
    wherein at least some of the gas no longer utilized by the gas-to-electricity converter due to the decreased gas consumption is directed to the gas storage, thereby increasing the amount of gas in the gas storage.

11. The system of claim 10, wherein the computer-executable instructions for decreasing the processing performed by the data center comprise computer-executable instructions for offloading processing to other data centers.

* * * * *